United States Patent
Ohkubo et al.

(10) Patent No.: US 8,304,692 B2
(45) Date of Patent: Nov. 6, 2012

(54) FORCED PRESSURE POWER SUPPLY TORCH

(75) Inventors: Jun Ohkubo, Osaka (JP); Masaru Nishimura, Osaka (JP)

(73) Assignee: Daihen Corporation, Osaka (JP)

( * ) Notice: Subject to any disclaimer, the term of this patent is extended or adjusted under 35 U.S.C. 154(b) by 389 days.

(21) Appl. No.: 12/669,146

(22) PCT Filed: Sep. 19, 2008

(86) PCT No.: PCT/JP2008/067027
§ 371 (c)(1),
(2), (4) Date: Jan. 14, 2010

(87) PCT Pub. No.: WO2009/041368
PCT Pub. Date: Apr. 2, 2009

(65) Prior Publication Data
US 2010/0206852 A1    Aug. 19, 2010

(30) Foreign Application Priority Data
Sep. 28, 2007    (JP) .................. 2007-254291

(51) Int. Cl.
*B23K 9/28* (2006.01)
(52) U.S. Cl. .............................. 219/137.31; 219/137.61
(58) Field of Classification Search .................. 219/108, 219/50, 78.01, 130.1, 136, 137.31
See application file for complete search history.

(56) References Cited

U.S. PATENT DOCUMENTS

| 4,956,540 A | * | 9/1990 | Kohno et al. | .................. 219/127 |
| 6,559,416 B1 | * | 5/2003 | Steenis et al. | ............ 219/137.61 |
| 7,663,074 B2 | * | 2/2010 | Wells | ........................ 219/137.31 |

FOREIGN PATENT DOCUMENTS

| JP | 57-134279 | | 8/1982 |
| JP | 57134279 | A | 8/1982 |
| JP | 10-193124 | | 7/1998 |
| JP | 2002-059265 | * | 2/2002 |
| JP | 2002059265 | A | 2/2002 |
| JP | 2003-112261 | | 4/2003 |

OTHER PUBLICATIONS

International Preliminary Report dated May 4, 2010 of International Application No. PCT/JP2008/067027 filed Sep. 19, 2008 on behalf of Daihen Corporation; (5 pp.).

* cited by examiner

*Primary Examiner* — Pho M Luu
*Assistant Examiner* — Thao Bui
(74) *Attorney, Agent, or Firm* — James R. Gourley; Colin P. Cahoon; Carstens & Cahoon, LLP

(57) ABSTRACT

A welding torch 30 has a first tip body 32, a pressurization shaft 43, and a second tip body 50 detachably connected to a distal end of the first tip body 32. A power supply tip 54 is accommodated in an accommodation hole 51 of the second tip body 50. The power supply tip 54 is removable from the accommodation hole 51 of the second tip body 50 after the second tip body 50 is removed from the first tip body 32. The power supply tip 54 is held in contact with the pressurization shaft 43 and urged by a compression spring 44 when the second tip body 50 is connected to the first tip body 32. A tip holder 60 is arranged at a distal end of the second tip body 50 in such a manner as to cover a distal end of the power supply tip 54.

7 Claims, 8 Drawing Sheets

FORCED PRESSURE POWER SUPPLY TORCH

FIELD OF THE INVENTION

The present invention relates to a forced pressure power supply torch.

BACKGROUND OF THE INVENTION

FIG. 7 shows a typical system of a welding robot using an articulated robot as an industrial robot. With reference to FIG. 7, a wrist portion 12 is formed at an end of a manipulator 11 configured by a plurality of arms. A welding torch 13, which is an end effecter, is attached to the distal end of the wrist portion 12. A welding wire is wound around a wire reel 14. The welding wire is passed through a conduit pipe 15 and supplied to the welding torch 13 by a wire feeder 16, which is attached to the manipulator 11. The conduit pipe 15 guides the welding wire from the wire reel 14 to the wire feeder 16. A single wire power cable 26, which is a torch cable, guides the welding wire from the wire feeder 16 to the welding torch 13.

The welding torch 13 receives power from a welding power source 17 through the single wire power cable 26 and shield gas from a gas cylinder 18. A teach pendant 19 inputs a command signal to a robot controller 10. The robot controller 10 inputs a signal to the manipulator 11. This rotates first to sixth axes of the manipulator 11, thus regulating the position of the distal end of the welding torch 13.

FIG. 8 shows the structure of a typical conventional welding torch 13. As illustrated in FIG. 8, a tip body 21 is attached to a torch body 20 of a welding torch 13. A power supply tip 22 is attached to a distal end 21a of the tip body 21. An insertion hole, through which a wire W is passed, is formed in a central portion of the power supply tip 22. The power supply tip 22 and the wire W contact each other to feed power to the wire W. A nozzle 23 is arranged around the power supply tip 22 and an orifice 24. The orifice 24 is arranged in such a manner as to substantially cover the circumferential surface of a distal portion of the tip body 21.

After having been supplied from the gas cylinder 18, the shield gas is ejected through the hole of the orifice 24. This shields an arc, a welding pool, and the vicinities of the arc and the welding pool from the nitrogen and the oxygen contained in the atmospheric air. An insulation bush 25 is attached to the outer circumferential surface of a central portion of the tip body 21.

However, in the welding torch configured as described above, spatter generated through arc welding adheres to the power supply tip, thus destabilizing the arc. Patent Document 1 proposes an apparatus that covers the circumference of a power supply tip by means of a tip cover to prevent spatter caused by arc welding from adhering to the power supply tip. Patent Document 2 proposes an apparatus having a cover with a wire insertion hole that is screwed to the distal end of a power supply tip of a welding torch.

In the welding torch 13, the power supply tip and the wire slide relatively on each other, and wear caused by such sliding cannot be avoided. This necessitates replacement of the power supply tip. However, in the apparatuses disclosed in Patent Documents 1 and 2, the power supply tip is screwed to and joined with the tip body and the tip cover is connected to the power supply tip through screwing or swaging. Accordingly, to replace the power supply tip, it is necessary to remove the power supply tip from the tip body and then the tip cover from the power supply tip. As a result, the welding torch having the tip cover covering the power supply tip has a disadvantage that the replacement of the power supply tip is complicated and cannot be accomplished easily.

Patent Document 1: Japanese Laid-Open Patent Publication No. 10-193124

Patent Document 2: Japanese Laid-Open Patent Publication No. 2003-112261

SUMMARY OF THE INVENTION

Accordingly, it is an objective of the present invention to provide a forced pressure power supply torch that facilitates the replacement of a power supply tip in a welding torch having a tip cover covering the power supply tip.

To achieve the foregoing objective and in accordance with a first aspect of the present invention, a forced pressure power supply torch comprising a first conductive tip body, a pressurization shaft, a compression spring, a second conductive tip body, a power supply tip, and a tip cover is provided. The first conductive tip body is connected to a torch body and has a first wire insertion hole formed in a portion of the first tip body in an axial direction. The pressurization shaft is passed through the first wire insertion hole of the first tip body and has a second wire insertion hole. The compression spring has a first end engaged with the torch body and a second end held in contact with the pressurization shaft. The second conductive tip body is detachably connected to a distal end of the first tip body and has an accommodation hole formed in a central portion of the second tip body in the axial direction. The power supply tip has a third wire insertion hole formed in a central portion of the power supply tip in the axial direction. The power supply tip is removable from the accommodation hole after the second tip body is removed from the first tip body. When the second tip body is connected to the first tip body, the power supply tip is arranged along the axial direction in the accommodation hole and urged by the compression spring with a proximal end of the power supply tip held in contact with the pressurization shaft. A tip cover is detachably connected to a distal end of the second tip body and arranged in such a manner as to cover a distal end of the power supply tip, the tip cover having a fourth wire insertion hole.

In this configuration, after the second tip body is removed from the first tip body to replace the power supply tip, the power supply tip is removable from the accommodation hole of the second tip body. Accordingly, the power supply tip is easily removed simply by arranging the second tip body in such a manner that the proximal end of the second tip body faces downward. This facilitates the replacement of the power supply tip.

In the above forced pressure power supply torch, it is preferable that the power supply tip have a retainer portion that prevents the power supply tip from moving along the axial direction in the accommodation hole of the second tip body and coming off the accommodation hole at the distal end of the power supply tip.

In this configuration, the power supply tip has the retainer portion. Accordingly, even after the tip cover is removed from the second tip body to replace the tip cover due to spatter adhesion, the power supply tip is prevented from moving along the axial direction and coming off the accommodation hole at the distal end of the power supply tip. Since the power supply tip is prevented from falling off after the tip cover is removed, the tip cover can be replaced easily.

In the above forced pressure power supply torch, the retainer portion is preferably a projection formed on the power supply tip.

In this configuration, the projection easily prevents the power supply tip from moving along the axial direction and coming off the accommodation hole at the distal end of the power supply tip.

In the above forced pressure power supply torch, it is preferable that: the projection be formed on an outer circumferential surface of the power supply tip and engaged with an engagement step formed in the accommodation hole of the second tip body; the tip cover be conductive; a tapered surface be formed in the fourth wire insertion hole of the tip cover; a tapered contact surface that contacts the tapered surface of the tip cover be formed in the power supply tip; and the compression spring urge the contact surface of the power supply tip to contact the tapered surface of the tip cover.

In this configuration, the compression spring urges and presses the power supply tip and the contact surface of the power supply tip contacts the tapered surface of the tip cover. This supplies an electric current to the power supply tip through the first and second tip bodies and the tip cover.

In the above forced pressure power supply torch, the tip cover is preferably arranged in such a manner as to form a clearance between an inner surface of the fourth wire insertion hole and the power supply tip.

In this configuration, the tip cover is arranged in such a manner as to form the clearance between the portions of the inner surface of the fourth wire insertion hole other than the tapered surface, which contacts the contact surface of the power supply tip, and the power supply tip. This prevents the power supply tip from receiving arc heat directly from the tip cover. Softening of the power supply tip is thus suppressed, preventing wear of the power supply tip and prolonging life of the power supply tip. Temperature rise of the power supply tip is also suppressed, and oxidization of the power supply tip is thus prevented.

In the above forced pressure power supply torch, it is preferable that: a tapered surface be formed in the accommodation hole of the second tip body; the projection be formed on an outer circumferential surface of the power supply tip and has a tapered contact surface engaged with the tapered surface of the second tip body; and the compression spring urge the contact surface of the power supply tip to contact the tapered surface of the second tip body.

In this configuration, the compression spring urges and presses the power supply tip and the contact surface of the power supply tip contacts the tapered surface of the second tip body. As a result, an electric current is supplied to the power supply tip through the first and second tip bodies.

In the above forced pressure power supply torch, the tip cover is preferably formed of ceramic.

In this configuration, the tip cover is formed of ceramic. This suppresses deformation of the power supply tip caused by spatter adhesion or influence of heat. The life of the power supply tip is thus prolonged. This decreases the number of replacement of a component or the number of components for replacement.

In the above forced pressure power supply torch, the tip cover is preferably arranged in such a manner as to form a clearance between an inner surface of the fourth wire insertion hole and the power supply tip.

In this configuration, the tip cover is arranged in such a manner as to form the clearance between the inner surface of the fourth wire insertion hole and the power supply tip. This prevents the power supply tip from receiving arc heat directly from the tip cover. Softening of the power supply tip is thus suppressed, preventing wear of the power supply tip and prolonging the life of the power supply tip. Temperature rise of the power supply tip is also suppressed, and oxidization of the power supply tip is prevented.

In the above forced pressure power supply torch, the power supply tip preferably has a slotted portion formed by a slit extending along the axial direction from the distal end of the power supply tip to the vicinity of the proximal end of the power supply tip.

In this configuration, the power supply tip is a collet type having slotted portions. The wire is thus constantly centered and maintained at a target position. Further, since slits are formed in the power supply tip, swarf of the wire generated through friction at the time when the wire is fed is discharged from the slits to the exterior. This suppresses a problem of wire feeding.

DETAILED DESCRIPTION OF THE PREFERRED EMBODIMENTS

Figure 2:
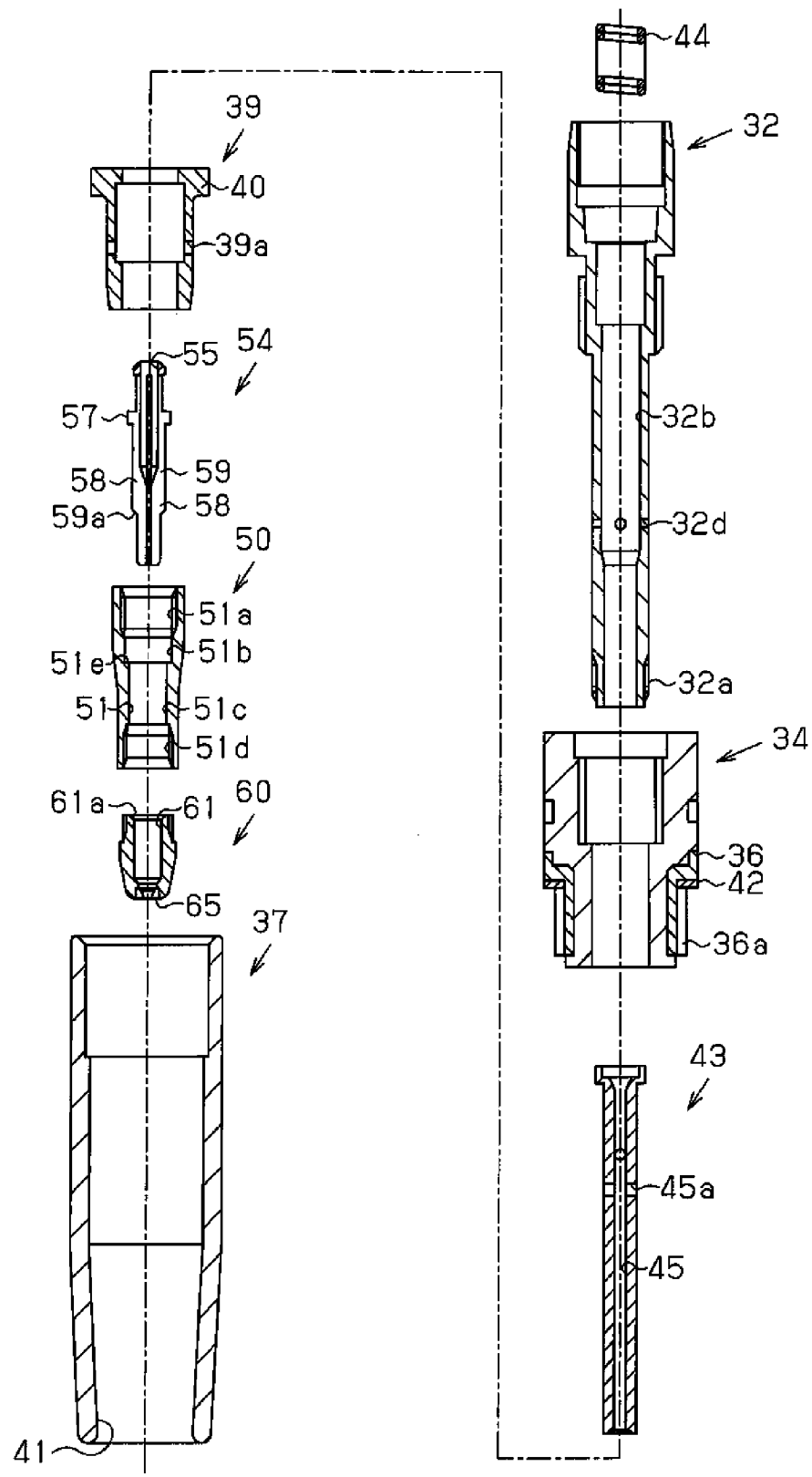
FIG. 2 is an exploded cross-sectional view showing the welding torch.
Figure 3A:
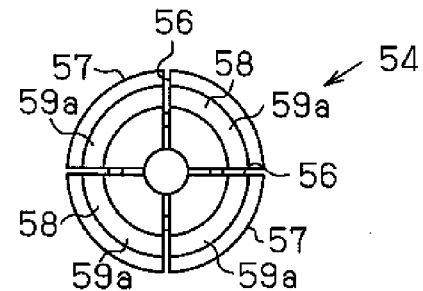
FIG. 3(a) is a front view showing a power supply tip.
Figure 3B:
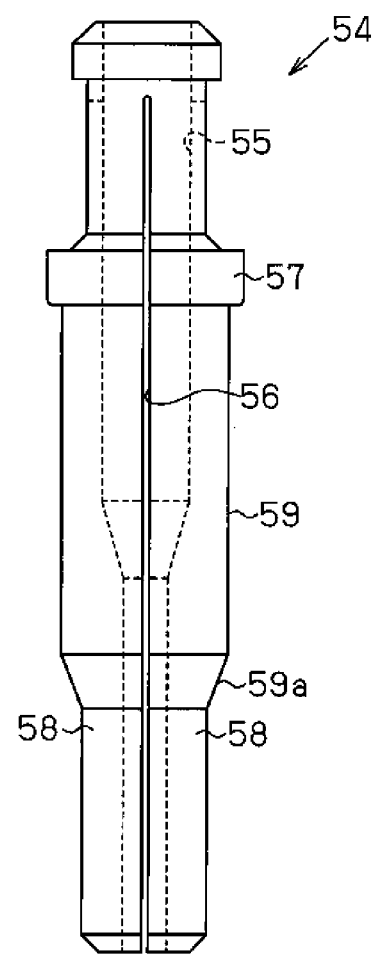
FIG. 3(b) is a side view showing the power supply tip.
Figure 3C:
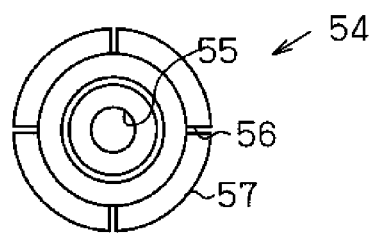
FIG. 3(c) is a rear view showing the power supply tip.

One embodiment of the present invention, which is a consumable electrode type gas shield arc welding torch, will now be described with reference to FIGS. 1 to 3.

Figure 1:
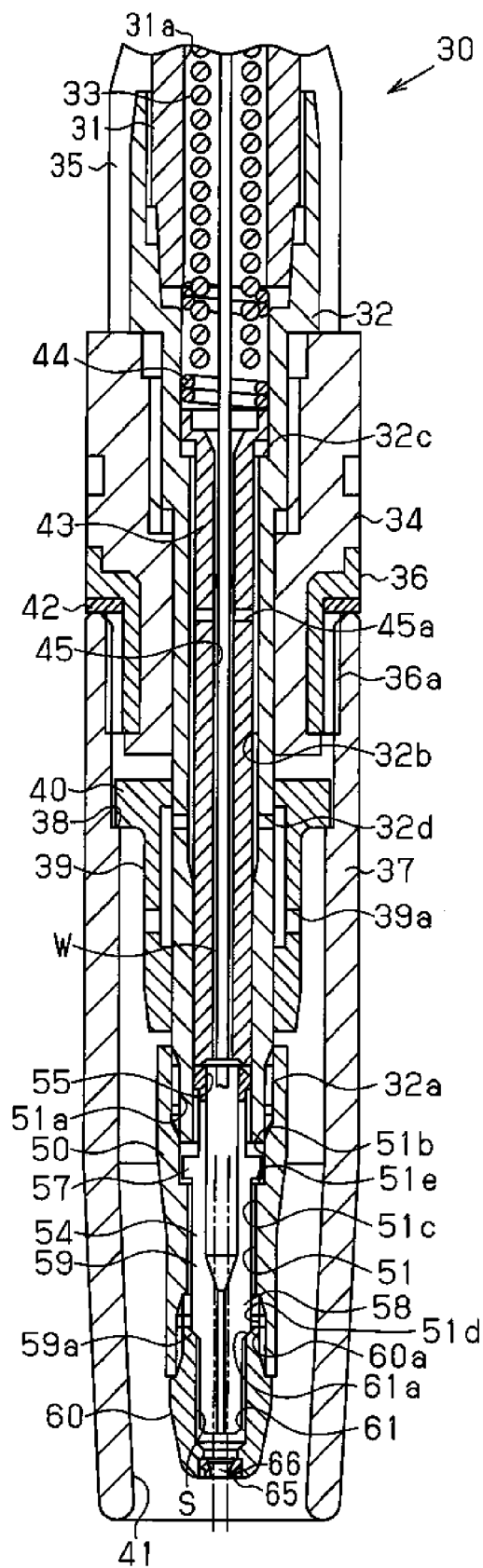
FIG. 1 is a longitudinal cross-sectional view showing a welding torch according to a first embodiment of the present invention.

As shown in FIG. 1, a first tubular tip body 32 is connected to the distal end (the lower end as viewed in FIG. 1) of a torch body 31 of a welding torch 30. The torch body 31 and the first tip body 32 are each formed of conductive material such as copper. An external thread 32a is formed at the distal end of the first tip body 32. A second tip body 50 is removably screwed to the distal end of the first tip body 32.

A first wire insertion hole 32b, which is arranged coaxially with a wire insertion hole 31a of the torch body 31, is formed in a central portion of the first tip body 32 in the axial direction. An engagement step 32c is formed in the vicinity of the proximal end of the first wire insertion hole 32b and in a portion of the first wire insertion hole 32b having a greater diameter than the other portions of the first wire insertion hole 32b. A coil liner 33 is arranged in the first tip body 32. The coil liner 33 is passed through the torch body 31 and extends to a position close to the engagement step 32c. An insulation bush 34 is screwed to the outer circumferential surface of the first tip body 32 in a longitudinal central portion of the first tip body 32. An insulation tube 35 covers the upper end of the first tip body 32 and the outer circumferential surface of the torch body 31 that are not covered by the insulation bush 34.

A ferrule 36, which extends from the center to the lower end of the insulation bush 34, is fixed to the outer circumferential surface of the insulation bush 34. An external thread 36a is formed on the ferrule 36 and a nozzle 37 is removably screwed to the ferrule 36 through the external thread 36a. A tip holder 60 serving as a tip cover is attached to the distal end of the second tip body 50. The nozzle 37 is arranged around the second tip body 50, the tip holder 60, and the distal end of the insulation bush 34.

A pressurization shaft 43 is passed through the first wire insertion hole 32b of the first tip body 32. The proximal end of the pressurization shaft 43 has a greater diameter than the other portions of the pressurization shaft 43 and is held in contact and engaged with the engagement step 32c. A compression spring 44 formed by a coil spring is arranged between the distal surface of the torch body 31 and the proximal surface of the pressurization shaft 43. The compression spring 44 urges the pressurization shaft 43 toward the second tip body 50. A second wire insertion hole 45, which is arranged coaxially with the wire insertion hole 31a of the torch body 31 and the first wire insertion hole 32b of the first tip body 32, is formed in a central portion of the pressurization shaft 43 in the axial direction. The second wire insertion hole 45 can communicate with the exterior through a communication hole 45a.

An engagement step 38 is formed in the inner circumferential surface of the nozzle 37. A flange 40, which is arranged at the upper end of an orifice 39, is engaged with the engagement step 38. The orifice 39 is arranged around the first tip body 32 in such a manner that the orifice 39 is slidable along the axial direction of the first tip body 32. After having been supplied from a non-illustrated gas cylinder, shield gas flows through the wire insertion hole 31a of the torch body 31, the second wire insertion hole 45 and the communication hole 45a of the pressurization shaft 43, and the first wire insertion hole 32b and a communication hole 32d of the first tip body 32, then passes a communication hole 39a formed in the orifice 39, and is ejected from a nozzle distal end 41. The shield gas, which has been ejected in the above-described manner, shields a welding pool from the air. A washer 42 is arranged between the nozzle 37 and the ferrule 36.

The second tip body 50 is formed of conductive material such as copper. An internal thread 51d is formed at the distal end of the second tip body 50 and the tip holder 60 is removably screwed to the distal end of the second tip body 50 through the internal thread 51d.

An accommodation hole 51 is formed in a central portion of the second tip body 50 in the axial direction. The accommodation hole 51 has an internal thread 51a, a large diameter portion 51b, a small diameter inserting portion 51c, and an internal thread 51d, which are arranged in this order from the side corresponding to the proximal end of the second tip body 50. An engagement step 51e is formed between the large diameter portion 51b and the inserting portion 51c. The internal thread 51a of the second tip body 50 is removably screwed to the external thread 32a of the first tip body 32.

A power supply tip 54 is accommodated in the accommodation hole 51. A proximal portion of the power supply tip 54 is supported in the first wire insertion hole 32b of the first tip body 32 so as to be movable in the axial direction with respect to the open end of the first wire insertion hole 32b. The distal surface of the pressurization shaft 43 is held in contact with the proximal portion of the power supply tip 54.

The power supply tip 54 is formed of conductive material such as copper. A third wire insertion hole 55 is formed in a central portion of the power supply tip 54 in the axial direction. The power supply tip 54 may be formed of sintered material with high hardness such as copper tungsten, a copper alloy such as chromium copper and beryllium copper, or conductive ceramic. In the present embodiment, the power supply tip 54 is formed of copper tungsten. A plurality of slits 56, each of which extends from the distal end to the vicinity of the proximal end of the power supply tip 54 along the axial direction, are formed in the power supply tip 54. Accordingly, the power supply tip 54 has a plurality of slotted portions 58, which are divided pieces. In the present embodiment, as illustrated in FIG. 3(a), four slotted portions 58 are formed by the four slits 56, which are arranged in a cross-shaped manner. However, the number of the slotted portions 58 is not restricted to four. That is, for example, a single slotted portion or a plurality of slotted portions may be formed by a single slit or a plurality of slits that are spaced apart at equal angular intervals.

An engagement flange 57, which serves as a retainer portion and a projection, is formed on the outer circumferential surface of the power supply tip 54. The engagement flange 57 is arranged closer to the proximal end of the power supply tip 54 than to the center of the power supply tip 54. The engagement flange 57 is engaged with the engagement step 51e of the second tip body 50. The engagement flange 57 prevents the power supply tip 54 from moving toward the distal end with respect to the accommodation hole 51 of the second tip body 50, or in other words, coming off the accommodation hole 51 of the second tip body 50 at the distal end of the power supply tip 54. By moving the power supply tip 54 toward the proximal end, the power supply tip 54 is removed from the accommodation hole 51 of the second tip body 50. The projection is not restricted to the engagement flange 57. In other words, as long as the projection is held in contact and engaged with the engagement step 51e, the projection is not restricted to any particular shape. An extended portion 59 having a greater diameter than the outer diameter of the distal end of each slotted portion 58 is formed substantially in a central portion of the slotted portions 58 in the axial direction. A tapered contact surface 59a is formed at the lower end of the extended portion 59 in such a manner that the outer diameter of the contact surface 59a becomes smaller toward the distal end of the extended portion 59 (see FIG. 3(b)).

The tip holder 60 is formed of conductive material such as stainless steel or chromium copper. The tip holder 60 has a cylindrical shape. An external thread 60a is formed at the proximal end of the tip holder 60. The internal thread 51d of the second tip body 50 is screwed to the external thread 60a of the tip holder 60. This enables conduction between the tip holder 60 and the second tip body 50. A fourth wire insertion hole 61 is formed in a central portion of the tip holder 60 in the axial direction. With reference to FIG. 1, the inner diameter of the fourth wire insertion hole 61 is greater than the outer diameter of the power supply tip 54 in the vicinity of the distal ends of the slotted portions 58. This sets a clearance S between the inner circumferential surface of the fourth wire insertion hole 61 and the outer circumferential surfaces of the slotted portions 58.

A tapered surface 61a, which is formed through chamfering, is arranged at a proximal open end of the fourth wire insertion hole 61. When the compression spring 44 urges the pressurization shaft 43 to press the power supply tip 54, the tapered surface 61a of the tip holder 60 is brought into contact with a contact surface 59a of each slotted portion 58. This enables conduction between the tip holder 60 and the power supply tip 54.

When the power supply tip 54 is pressed and the contact surfaces 59a of the slotted portions 58 are brought into contact with the tapered surface 61a of the tip holder 60 as has been described, the slotted portions 58 each move inward (toward the axis). This reduces the size of each slit 56, which is formed between the corresponding ones of the slotted portions 58, thus allowing the slotted portions 58 to contact the circumferential surface of the wire W, which is passed through the third wire insertion hole 55. At this stage, the slotted portions 58 are arranged at the entire circumference of the wire W and thus allowed to reliably contact the substantially entire outer circumferential surface of the wire W.

With reference to FIG. 1, the distal end of the fourth wire insertion hole 61 extends further along the axial direction from the distal ends of the slotted portions 58. The tip holder 60 is thus arranged in such a manner as to cover the slotted portions 58. A welding prevention member 65 is fixed to the inner surface of the fourth wire insertion hole 61 at the distal end of the fourth wire insertion hole 61. The welding prevention member 65 is formed of heat resistant material such as ceramic. A wire insertion hole 66, which is arranged coaxially with the third wire insertion hole 55 of the power supply tip 54, is formed in a central portion of the welding prevention member 65 in the axial direction. The distal end of the tip holder 60 is formed in a truncated cone-like shape. The portion of the tip holder 60 other than the portion screwed to the internal thread 51d of the second tip body 50, which is the exposed surface of the tip holder 60 that is not covered by the second tip body 50, is plated so as to suppress adhesion of spatter. The exposed surface of the tip holder 60 includes, for example, a tapered surface and a distal surface of the truncated cone-like portion.

Operation of First Embodiment

Operation of the welding torch 30, which has the above-described configuration, will hereafter be explained.

As illustrated in FIG. 1, the wire W, which is guided to extend through the torch body 31, the first tip body 32, and the pressurization shaft 43, is passed through the third wire insertion hole 55 of the power supply tip 54. The entire circumferential surface of the wire W is held in contact with the slotted portions 58 of the power supply tip 54. In this state, the wire W extends along the axis direction and projects from the distal end of the nozzle 37 through the wire insertion hole 66 of the welding prevention member 65.

After having been supplied from a non-illustrated welding power source, the power flows through the torch body 31, the first tip body 32, the second tip body 50, the tip holder 60, and the slotted portions 58 and is sent from the slotted portions 58 to the wire W.

The clearance S is formed between the outer circumferential surfaces of the slotted portions 58 and the tip holder 60. The clearance S prevents the heat generated through welding from transmitting directly to the power supply tip 54. This suppresses heat transmission to the power supply tip 54, preventing temperature rise in the power supply tip 54. Also, by forming the tip holder 60 using conductive material with low heat conductivity, the heat transmission to the power supply tip 54 is further effectively suppressed. This decreases wear of the tip, thus prolonging life of the power supply tip 54.

The compression spring 44 forcibly pressurizes the wire W. This allows the multiple slotted portions 58 to contact the substantially entire circumferential surface of the wire W. Stable power supply to the wire W is thus ensured constantly, thus preventing arcing inside the tip. This decreases wear of the tip, further prolonging the life of the tip.

To replace the power supply tip 54, the nozzle 37 is removed from the insulation bush 34. The second tip body 50 is then detached from the first tip body 32. At this stage, the tip holder 60, together with the second tip body 50, is removed from the first tip body 32. Then, by arranging the second tip body 50 in such a manner that the proximal end of the second tip body 50 faces downward, the power supply tip 54 falls from inside the accommodation hole 51 of the second tip body 50 and is thus easily removed. Afterwards, a new power supply tip 54 is inserted into the accommodation hole 51 of the second tip body 50 and the second tip body 50 is screwed to the external thread 32a of the first tip body 32. The nozzle 37 is then screwed to the external thread 36a of the insulation bush 34.

To replace the tip holder 60, the nozzle 37 is removed from the insulation bush 34 and, in this state, the tip holder 60 is removed from the second tip body 50 with the second tip body 50 maintained in a state attached to the first tip body 32. Since the engagement flange 57 of the power supply tip 54 is held in contact with the engagement step 51e after the tip holder 60 is removed, the power supply tip 54 is prevented from coming off the accommodation hole 51 of the second tip body 50. After a new tip holder 60 is screwed to the internal thread 51d of the second tip body 50, the nozzle 37 is mounted by screwing the nozzle 37 to the external thread 36a of the insulation bush 34.

The welding torch 30, which is configured as described above, has the characteristics described below.

(1) The welding torch 30 has the first conductive tip body 32 having the first wire insertion hole 32b, the pressurization shaft 43 having the second wire insertion hole 45, and the compression spring 44 having a first end engaged with the torch body 31 and a second end held in contact with the pressurization shaft 43. The pressurization shaft 43 is passed through the first wire insertion hole 32b of the first tip body 32. The welding torch 30 has the second conductive tip body 50 having the accommodation hole 51, which is formed in the central portion of the second tip body 50 in the axial direction. The second tip body 50 is detachably connected to the distal end of the first tip body 32. The power supply tip 54 having the third wire insertion hole 55 is accommodated in the central portion of the accommodation hole 51 of the second tip body 50 in the axial direction. When the second tip body 50 is removed from the first tip body 32, the power supply tip 54 is removable from the accommodation hole 51 of the second tip body 50. When the second tip body 50 is connected to the first tip body 32, the power supply tip 54 is arranged along the axial direction in the accommodation hole 51 of the second tip body 50. The proximal end of the power supply tip 54 is held in contact with the pressurization shaft 43 and thus urged by the compression spring 44. The tip holder 60 having the fourth wire insertion hole 61 is detachably connected to the distal end of the second tip body 50. The tip holder 60 is arranged in such a manner as to cover the distal end of the power supply tip 54.

In this configuration, to replace the power supply tip 54, the second tip body 50 is removed from the first tip body 32 to permit removal of the power supply tip 54 from the accommodation hole 51 of the second tip body 50. Accordingly, simply by arranging the second tip body 50 in such a manner that the proximal end of the second tip body 50 faces downward, the power supply tip 54 is easily removed. This facilitates the replacement of the power supply tip 54 and thus improves work efficiency.

(2) The power supply tip 54 has the engagement flange 57 serving as the retainer portion and the projection. The engagement flange 57 prevents the power supply tip 54 from moving toward the distal end in the axial direction with respect to the accommodation hole 51 of the second tip body 50, or in other words, coming off the accommodation hole 51 of the second tip body 50 at the distal end of the power supply tip 54. In this configuration, when the tip holder 60 needs to be replaced due to adhesion of spatter, the power supply tip 54 is prevented from coming off the second tip body 50 by moving along the axial direction even after the tip holder 60 is removed from the second tip body 50. In other words, the power supply tip 54 is prevented from falling off even after the tip holder 60 is removed. This facilitates the replacement of the tip holder 60 and thus enhances work efficiency.

(3) The engagement flange 57 is formed on the circumferential surface of the power supply tip 54 and engaged with the engagement step 51e formed in the accommodation hole 51 of the second tip body 50. The tip holder 60 is conductive. The tapered surface 61a is formed in the fourth wire insertion hole 61 of the tip holder 60. In the power supply tip 54, the contact surface 59a, which contacts the tapered surface 61a of the tip holder 60, is formed in a tapered shape. The compression spring 44 urges the contact surface 59a of the power supply tip 54 to contact the tapered surface 61a.

In this configuration, the compression spring 44 urges and presses the power supply tip 54 and the contact surface 59a of the power supply tip 54 contacts the tapered surface 61a of the tip holder 60. This allows supply of an electric current to the power supply tip 54 through the first tip body 32, the second tip body 50, and the tip holder 60.

(4) The tip holder 60 is arranged in such a manner as to form the clearance S between the power supply tip 54 and portions of the inner circumferential surface of the fourth wire insertion hole 61 other than the tapered surface 61a. In this configuration, the power supply tip 54 is prevented from receiving arc heat directly from the tip holder 60. This suppresses softening of the power supply tip 54, thus preventing wear of the power supply tip 54 and prolonging life of the power supply tip 54. Temperature rise of the power supply tip 54 is also prevented and thus oxidization of the power supply tip 54 is suppressed.

(5) The power supply tip 54 has the slotted portions 58 formed by the multiple slits 56 extending along the axial direction from the distal end to the vicinity of the proximal end of the power supply tip 54. In the present embodiment, since the power supply tip 54 is a collet type having the slotted portions 58, the wire W is constantly centered and maintained at a target position. Also, swarf of the wire W generated through feeding of the wire W is discharged from the slits 56 to the exterior. As a result, a problem of feeding the wire W is suppressed.

(6) The power supply tip 54 is formed of chromium copper or copper tungsten. A sintered material of the copper tungsten or the like is difficult to machine. However, in the present embodiment, the proximal end of the power supply tip 54 is simply engaged with the first tip body 32. Accordingly, the power supply tip 54 does not have to be machined to form a thread, and is easily shaped through pressing using a die. This reduces the material costs and the machining costs.

Second Embodiment

Figure 4:
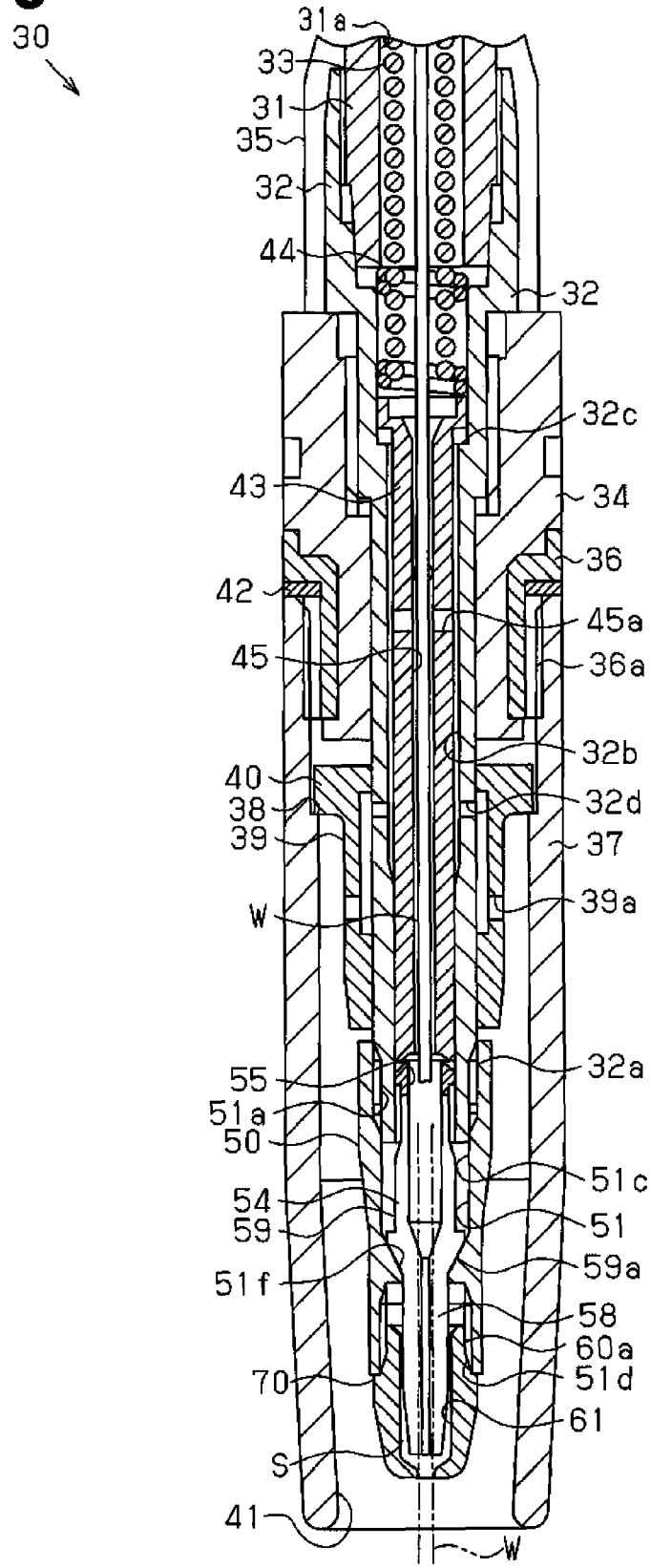
FIG. 4 is a longitudinal cross-sectional view showing a welding torch according to a second embodiment of the present invention.
Figure 5:
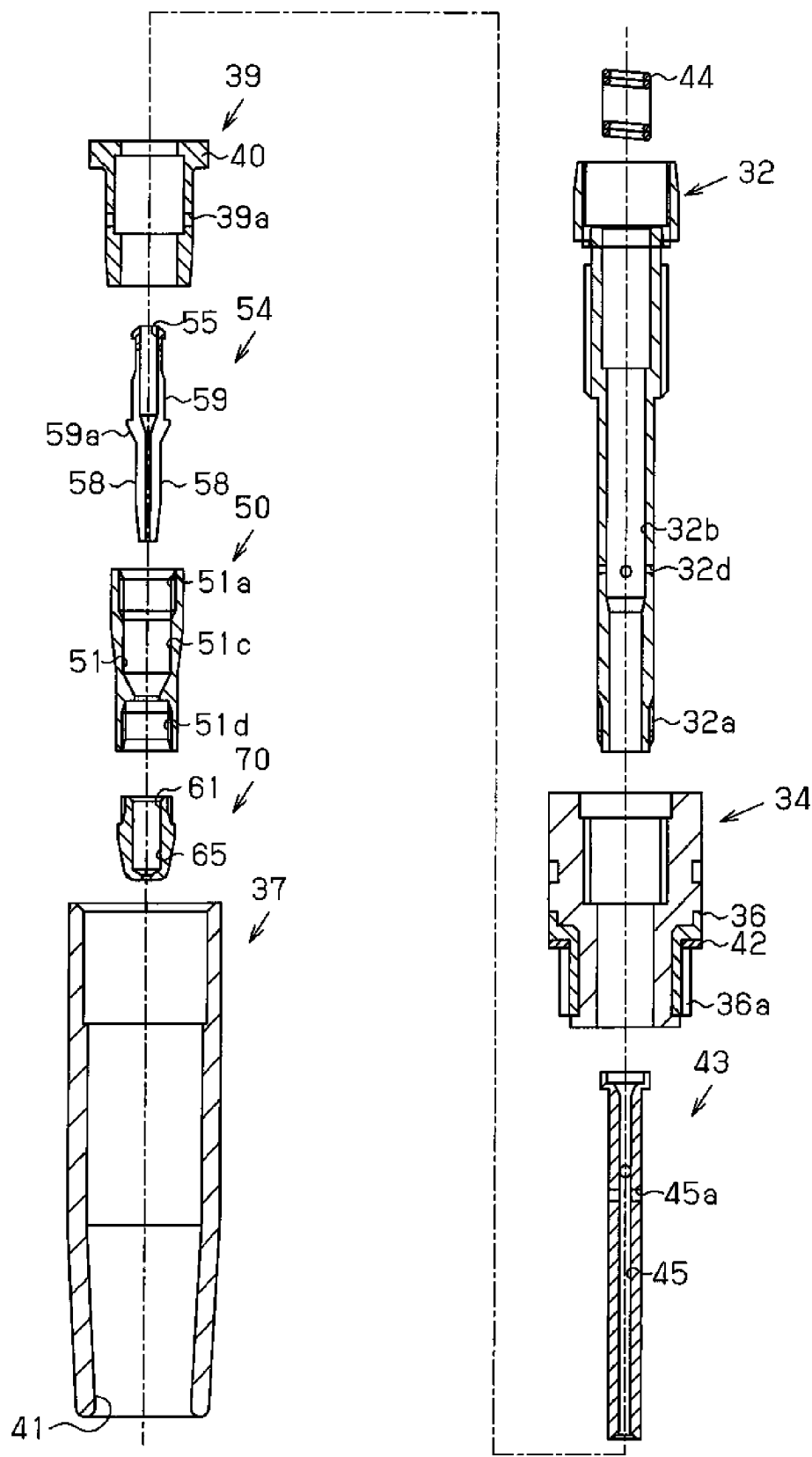
FIG. 5 is an exploded cross-sectional view showing the welding torch.
Figure 6A:
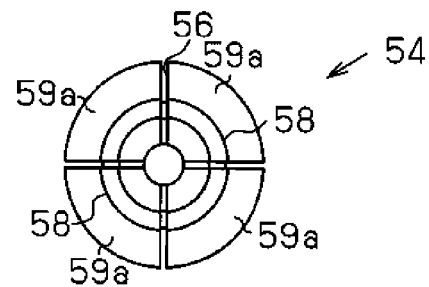
FIG. 6(a) is a front view showing a power supply tip.
Figure 6B:
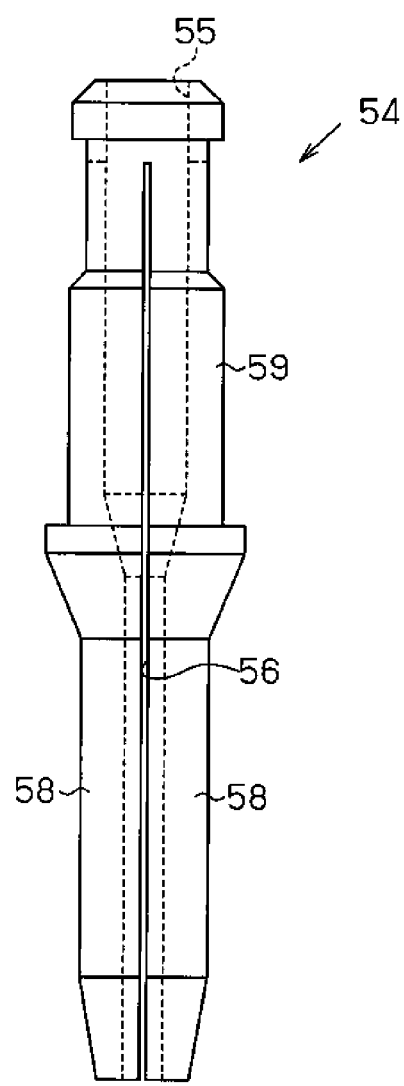
FIG. 6(b) is a side view showing the power supply tip.
Figure 6C:
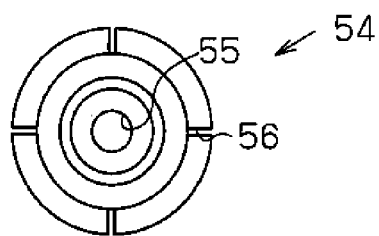
FIG. 6(c) is a rear view showing the power supply tip.
Figure 7:
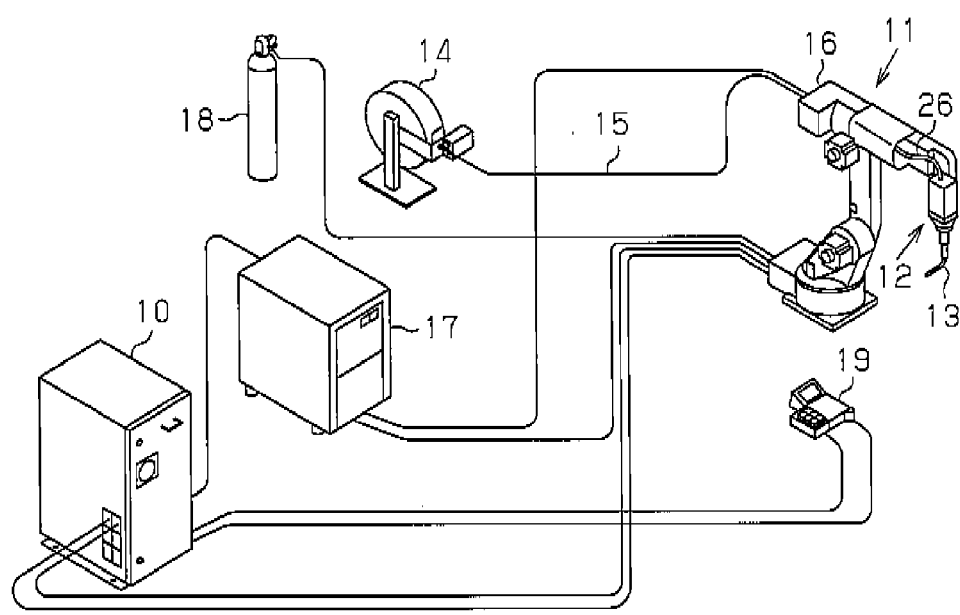
FIG. 7 is a view schematically showing a typical system of a welding robot.
Figure 8:
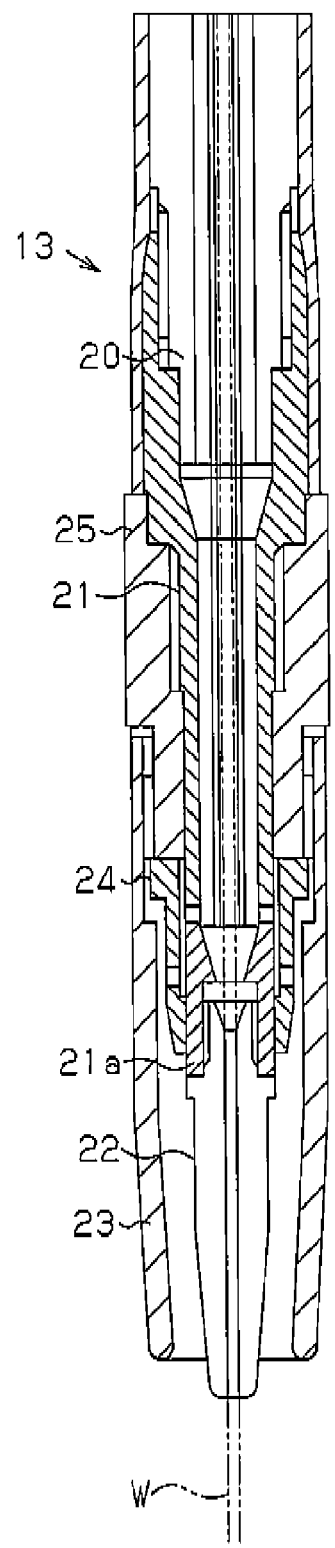
FIG. 8 is a longitudinal cross-sectional view showing a conventional welding torch.

A second embodiment of the present invention will hereafter be described with reference to FIGS. 4 to 6. Same or like reference numerals are given to components of the second embodiment that are the same as or like corresponding components of the first embodiment and explanation thereof will be omitted. The second embodiment will be described mainly on points different from corresponding points of the first embodiment.

In the second embodiment, the engagement flange 57 of the power supply tip 54 and the large diameter portion 51b and the engagement step 51e of the second tip body 50 are omitted. A tapered surface 51f having an inner diameter becoming smaller along the feeding direction of the wire W is formed at an end of the inserting portion 51c of the second tip body 50 in the feeding direction of the wire W. A corresponding contact surface of the power supply tip 54 is urged by the compression spring 44 to be pressed against the tapered surface 51f of the second tip body 50. In these points, the second embodiment is different from the first embodiment. In this configuration, power supplied by a non-illustrated welding power source flows through the torch body 31, the first tip body 32, the second tip body 50, and the slotted portions 58 and is fed from the slotted portions 58 to the wire W. In the second embodiment, the extended portion 59 of the power supply tip 54 corresponds to the retainer portion and the projection.

In the second embodiment, a tip cover 70, instead of the tip holder 60, is screwed to the internal thread 51d of the second tip body 50. The tip cover 70 is formed of insulating ceramic and shaped substantially identical with the tip holder 60. The tip cover 70 has a fourth wire insertion hole 61 identical to the fourth wire insertion hole 61 of the first embodiment. Further, in the second embodiment, the welding prevention member 65 is omitted and, instead, the distal opening of the fourth wire insertion hole 61 is narrowed. The power supply tip 54 is arranged in such a manner as to form a clearance S between the inner circumferential surface of the fourth wire insertion hole 61 and the slotted portions 58, in order to avoid contact between the power supply tip 54 and the tip cover 70.

The welding torch 30 of the second embodiment has the following characteristics in addition to advantages equivalent to the advantages (1), (4), (5), and (6) of the first embodiment.

(1) The power supply tip 54 has the extended portion 59 serving as the retainer portion and the projection. The extended portion 59 has the tapered contact surface 59a, which contacts the tapered surface 51f of the second tip body 50. The compression spring 44 urges the contact surface 59a of the power supply tip 54 to contact the tapered surface 51f. In this configuration, an electric current is supplied to the power supply tip 54 through the first tip body 32 and the second tip body 50.

(2) The tip cover 70 is formed of ceramic. This suppresses deformation of the power supply tip 54 caused by spatter adhesion or influence of heat. The life of the power supply tip 54 is thus prolonged. This decreases the number of replacement of a component and the number of components for replacement.

(3) After the tip cover 70 is removed from the second tip body 50 to replace the tip cover 70 due to spatter adhesion or the influence of heat, the power supply tip 54 is held in contact with the tapered surface 51f of the second tip body 50 and thus prevented from moving toward the distal end and being removed from the second tip body 50. In other words, even after the tip cover 70 is removed, the power supply tip 54 is prevented from falling off. This facilitates the replacement of the tip cover 70 and thus improves work efficiency.

(4) The tip cover 70 is arranged in such a manner as to form the clearance S between the inner surface of the fourth wire insertion hole 61 and the power supply tip 54. This prevents the power supply tip 54 from receiving arc heat directly from the tip cover 70. In this manner, softening of the power supply tip 54 is suppressed. This prevents wear of the power supply tip 54 and prolongs the life of the power supply tip 54. Also, temperature rise of the power supply tip 54 is suppressed, and oxidization of the power supply tip 54 is prevented.

The present invention may be configured in the forms described below.

In each of the illustrated embodiments, the welding torch may be changed to a water cooled torch or a semi-automatic torch.

Although the second tip body 50 is screwed to the first tip body 32 in the illustrated embodiments, the second tip body 50 may be fixed to the first tip body 32 through swaging or the like.

In the first embodiment, the tip holder 60 is screwed to the second tip body 50. However, the tip holder 60 may be fixed to the second tip body 50 through swaging or the like.

In the first embodiment, the exposed surface of the tip holder 60 is plated. However, the entire surface of the tip holder 60 may be plated.

Alternatively, the tip holder 60 may be formed of material with low heat conductivity such as stainless steel. That is, the tip holder 60 may be formed of, for example, conductive ceramic.

We claim:

1. A forced pressure power supply torch comprising:
    a first conductive tip body that is connected to a torch body and has a first wire insertion hole formed in a portion of the first tip body in an axial direction;
    a pressurization shaft that is passed through the first wire insertion hole of the first tip body and has a second wire insertion hole;
    a compression spring having a first end engaged with the torch body and a second end held in contact with the pressurization shaft;
    a second conductive tip body that is detachably connected to a distal end of the first tip body and has an accommodation hole formed in a central portion of the second tip body in the axial direction;
    a power supply tip having a third wire insertion hole formed in a central portion of the power supply tip in the axial direction, the power supply tip being removable from the accommodation hole after the second tip body is removed from the first tip body, wherein, when the second tip body is connected to the first tip body, the power supply tip is arranged along the axial direction in the accommodation hole and urged by the compression spring with a proximal end of the power supply tip held in contact with the pressurization shaft; and
    a tip cover that is detachably connected to a distal end of the second tip body and arranged in such a manner as to cover a distal end of the power supply tip, the tip cover having a fourth wire insertion hole,
    wherein the compression spring urges a contact surface of the power supply tip to contact a tapered surface of the tip cover, and
    wherein the tip cover is arranged in such a manner as to form a clearance between the power supply tip and portions of an inner circumferential surface of the fourth wire insertion hole other than the tapered surface.

2. The forced pressure power supply torch according to claim 1, wherein the power supply tip has a retainer portion that prevents the power supply tip from moving along the axial direction in the accommodation hole of the second tip body and coming off the accommodation hole at the distal end of the power supply tip.

3. The forced pressure power supply torch according to claim 2, wherein the retainer portion is a projection formed on the power supply tip.

4. The forced pressure power supply torch according to claim 3,
    wherein the projection is formed on an outer circumferential surface of the power supply tip and engaged with an engagement step formed in the accommodation hole of the second tip body,
    wherein the tip cover is conductive,
    wherein a tapered surface is formed in the fourth wire insertion hole of the tip cover,
    wherein a tapered contact surface that contacts the tapered surface of the tip cover is formed in the power supply tip.

5. The forced pressure power supply torch according to claim 3,
    wherein a tapered surface is formed in the accommodation hole of the second tip body,
    wherein the projection is formed on an outer circumferential surface of the power supply tip and has a tapered contact surface engaged with the tapered surface of the second tip body, and
    wherein the compression spring urges the contact surface of the power supply tip to contact the tapered surface of the second tip body.

6. The forced pressure power supply torch according to claim 5, wherein the tip cover is formed of ceramic.

7. The forced pressure power supply torch according to claim 1, wherein the power supply tip has a slotted portion formed by a slit extending along the axial direction from the distal end of the power supply tip to the vicinity of the proximal end of the power supply tip.

\* \* \* \* \*